United States Patent
Jonas et al.

(10) Patent No.: US 8,474,148 B2
(45) Date of Patent: *Jul. 2, 2013

(54) ARTICULATING PROBE HEAD APPARATUS AND METHOD

(75) Inventors: Kevyn Barry Jonas, Bristol (GB); Geoffrey McFarland, Wotton-under-Edge (GB); Nicholas John Weston, Peebles (GB); Colin Ray Bulled, Exeter (GB)

(73) Assignee: Renishaw PLC, Wotton-Under-Edge (GB)

( * ) Notice: Subject to any disclaimer, the term of this patent is extended or adjusted under 35 U.S.C. 154(b) by 229 days.

This patent is subject to a terminal disclaimer.

(21) Appl. No.: 12/926,361

(22) Filed: Nov. 12, 2010

(65) Prior Publication Data

US 2011/0061253 A1 Mar. 17, 2011

Related U.S. Application Data

(63) Continuation of application No. 12/223,656, filed as application No. PCT/GB2007/000514 on Feb. 14, 2007, now Pat. No. 7,861,430.

(30) Foreign Application Priority Data

Feb. 16, 2006 (GB) .................................. 0603128.0

(51) Int. Cl.
*G01B 5/008* (2006.01)
*B23Q 11/14* (2006.01)

(52) U.S. Cl.
USPC .......................................................... 33/503

(58) Field of Classification Search
USPC .................................................... 33/503, 702
See application file for complete search history.

(56) References Cited

U.S. PATENT DOCUMENTS

| 5,517,190 | A | 5/1996 | Gunn |
| 5,675,902 | A | 10/1997 | Chase |
| 6,844,720 | B1 | 1/2005 | Pokrywka |
| 7,861,430 | B2 * | 1/2011 | Jonas et al. ............. 33/503 |
| 2004/0184039 | A1 | 9/2004 | Christoph |

FOREIGN PATENT DOCUMENTS

| EP | 0 402 440 B1 | 6/1995 |
| EP | 0 690 286 A1 | 1/1996 |
| JP | A-2-41880 | 2/1980 |
| JP | A-3-79256 | 4/1991 |
| JP | A-2003-94290 | 4/2003 |

(Continued)

OTHER PUBLICATIONS

Office Action issued in corresponding Japanese Patent Application No. 2008-554839 mailed on Jan. 24, 2012. (with English language translation).

May 3, 2012 Office Action issued in Chinese Application No. 2007-80005906.0 (with translation).

*Primary Examiner* — Christopher Fulton
(74) *Attorney, Agent, or Firm* — Oliff & Berridge, PLC

(57) ABSTRACT

Apparatus for a co-ordinate positioning machine is described that comprises an articulating probe head for supporting a measurement probe. The articulating probe head comprises at least one electric motor. Heating means are provided for generating heat in the articulating probe head. The heating means may be the motors or discrete heating elements. Temperature sensing means, such as one or more temperature sensors, is also provided for determining the temperature at the articulating probe head. The apparatus allows the temperature of the articulating probe head to be controlled.

30 Claims, 2 Drawing Sheets

FOREIGN PATENT DOCUMENTS

Figure 1:
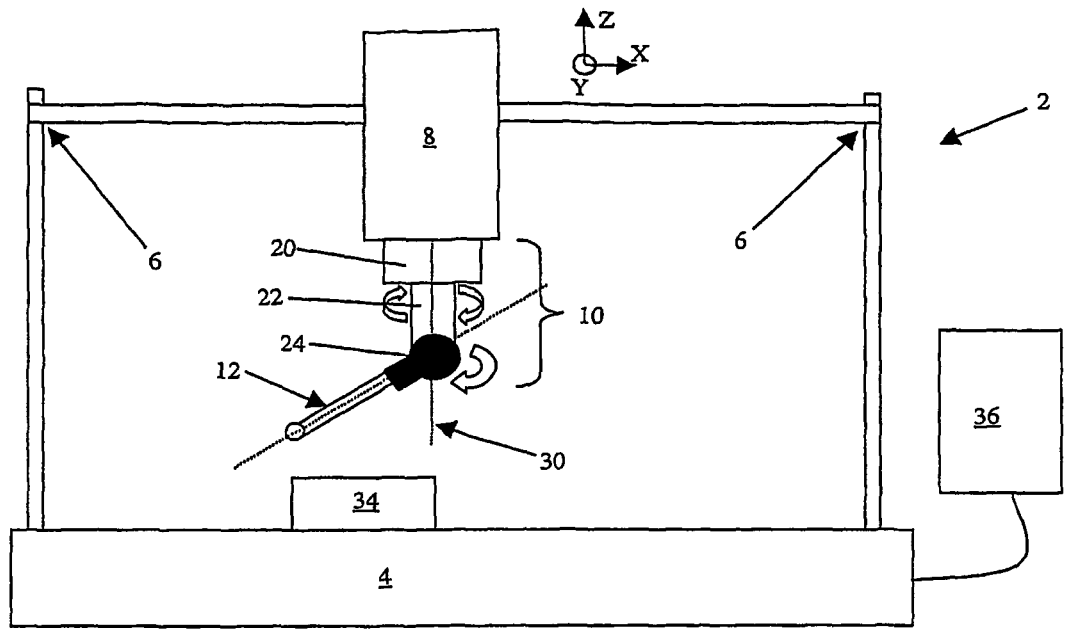

| WO | WO 89/07745 | 8/1989 |
| WO | WO 03/008898 A1 | 1/2003 |
| WO | WO 03/051575 A1 | 6/2003 |
| WO | WO 03051575 A1 * | 6/2003 |

* cited by examiner

ARTICULATING PROBE HEAD APPARATUS AND METHOD

This application is a continuation of U.S. patent application Ser. No. 12/223,656, filed on Aug. 6, 2008 (and which issued as U.S. Pat. No. 7,861,430 on Jan. 4, 2011), which is a National Phase of PCT/GB2007/000514, filed Feb. 14, 2007, and claims priority to GB 0603128.0, filed Feb. 16, 2006 in the United Kingdom. The entire disclosures of the prior applications are hereby incorporated herein by reference in their entirety.

The present invention relates to articulating probe head apparatus of the type used on co-ordinate positioning machines, such as co-ordinate measurement machines (CMMs) and the like. More particularly, the invention relates to articulating probe head apparatus incorporating temperature sensing means for implementing temperature control and/or compensation.

Articulating probe heads are known and have been described previously in, for example, EP360853, EP402440 and EP690286. A typical articulating probe head comprises a base that is attachable to the moveable arm of a co-ordinate positioning machine such as a machine tool or co-ordinate measuring machine (CMM). The articulating probe head is arranged to support a measurement probe with one or more degrees of rotational freedom relative to the moveable arm of the co-ordinate positioning machine. Such an arrangement has a number of advantages; for example, it allows differently oriented surfaces to be inspected by the measurement probe thereby allowing the probing of features on parts that would otherwise be inaccessible.

Articulating probe heads of the type described in EP690286 are so-called "indexing" heads. Such indexing heads comprise one or more motors that are used to move the measurement probe between a number of predetermined orientations that are fixed relative to the measurement arm of the co-ordinate positioning machine. Once the head is set in the desired position, co-ordinate measurements of a part are taken with the measurement probe by moving the measurement arm of the machine (e.g. by moving the arm along mutually orthogonal x, y and z axes). In other words, an indexing probe head is locked in a fixed position whilst co-ordinates are measured.

EP690286 also describes how a constant electrical current can be supplied to an indexing probe head in an attempt to keep the head in thermal equilibrium. In particular, EP690286 describes providing a heat generating means within the head that is activated when the drive motors are inactive so that a constant current is supplied to the probe head. However, such an arrangement has a number of disadvantages. For example, despite a constant level of heat generation, the head will settle to a temperature that depends on the ambient temperature. This can introduce uncertainty into the measured co-ordinates when the machine is operated in different environments.

EP402440 describes a further type of articulating probe head which is often termed an "active" or "servoing" head. Herein, such heads are termed active heads. In such an arrangement, the active head is configured to move the measurement probe relative to the base of the articulating head whilst measurements are taken. This provides 4 or more axis measurement in which movement of the 3 linear axes of the co-ordinate positioning machine is combined with movement of the one or more (e.g. two) rotational axes of the articulating head.

According to a first aspect of the invention, apparatus for a co-ordinate positioning machine is provided, the apparatus comprising an articulating probe head for supporting a measurement probe, wherein the articulating probe head comprises at least one electric motor and the apparatus comprises heating means for generating heat in the articulating probe head, characterised in that the apparatus comprises temperature sensing means for determining temperature at the articulating probe head.

The present invention thus provides an articulating probe head that is suitable for mounting on a co-ordinate positioning machine, such as a co-ordinate measurement machine (CMM), machine tool or single axis stage. The articulating probe head is also arranged to retain a measurement probe and the at least one electric motor allows, when a suitable drive current is applied, an attached measurement probe to be moved (e.g. rotated about one or more axes) relative to the portion of the co-ordinate positioning machine on which the articulating head is mounted.

The apparatus also comprises heating means for generating heat in the articulating probe head. The heating means may be located inside the articulating probe head or may be remote to, for example attached to the outer casing of, the articulating probe head. The heating means may conveniently comprise one or more sources of heat within the probe head and more preferably is arranged to generate heat at, and/or in the vicinity of, the at least one electric motor. As outlined in more detail below, the heating means may comprise discrete heating element(s) and/or the at least one electric motor itself.

In addition, the articulating probe head comprises temperature sensing means for determining temperature at the articulating probe head. For example, the temperature sensing means may advantageously comprise at least one temperature sensor mounted within, or attached to, the articulating probe head thereby allowing the temperature of one or more regions of the head to be measured. As described in more detail below, the temperature sensing means may be arranged to sense the temperature at one or more points of the articulating head away from the at least one electric motor and/or in the vicinity of the at least one electric motor.

The apparatus of the present invention has a number of advantages over apparatus of the type described in EP690286. As noted above, EP690286 describes providing a heating current to the articulating head when the motors therein are inactive. Such a heating current is selected to be substantially equal to the current required to drive the motor and it is thus assumed that the constant flow of heat into the active head will result in thermal equilibrium being achieved.

It has, however, been found that the technique of EP690286 does not always cause the articulating probe head to maintain the same temperature profile. In particular, it has been found that the amount of heat dissipated by an articulating head will vary with the orientation of that head. Furthermore, ambient temperature conditions will effect the thermal equilibrium that is reached by the probe head. The use of a direct temperature measurement in accordance with the present invention overcomes such disadvantages and provides an improved way of reducing, or ascertaining, the errors introduced into co-ordinate measurements due to thermal expansion effects within an articulating probe head.

Preferably, the apparatus further comprises a temperature controller, the temperature controller being arranged to receive a temperature signal from the temperature sensing means and to selectively activate the heating means so as to maintain the temperature sensed by the temperature sensing means within a first temperature range. For example, the temperature controller may be arranged to keep the temperature, as sensed by the temperature sensing means at a location within the probe head, at a first target temperature or within a first temperature range. The temperature controller thus provides control over heat generation within the head and allows the temperature at one or more locations within the probe head to be maintained at a certain target temperature or within a certain temperature range. The temperature controller may be arranged to simply activate or deactivate the heating means as required (e.g. it may switch the heating means "on" or "off"). Alternatively, the temperature controller may vary the power supplied to the heating means as required.

The temperature controller is conveniently arranged to implement closed loop feedback control. The time constant of such a closed feedback loop may be set as required and will depend on the heat capacity of the probe head and also the proximity of the heat source(s) to the position(s) at which the temperature is measured (e.g. the location of any temperature sensor). The temperature controller may be located, at least in part, in the articulating head and/or it may be provided, at least in part, in a separate interface or controller that is remote to the articulating probe head.

The first temperature range may have upper and lower limits that are both greater than 20° C., greater than 30° C., greater than 40° C. or greater than 50° C. The width of the first predetermined temperature range (i.e. the difference between the upper and lower temperature limits) may advantageously be less than 20° C., less than 10° C., less than 5° C. or less than 1° C. The first temperature range may be fixed for given apparatus or it may be user selectable. The temperature controller may also be arranged to automatically select the temperature range by, for example, reference to the ambient temperature or from historical temperature data of the environment in which the apparatus is operating.

The temperature controller may also be arranged so that, on machine start-up, the heating means are activated for a set period of time or until the temperature sensing means indicates that the first temperature range has been, or will shortly be, reached. To minimise the time required for the machine to reach its nominal operating temperature, the temperature controller may be arranged so that the heating means generates heat at an increased rate on start-up compared with the rate of heat generation that is subsequently used to maintain the temperature within the desired range. In other words, an initial burst of heat may be used to rapidly heat the articulating probe head to the desired operating temperature. It should be noted that this initial burst of heat may be sufficient to increase the temperature of some regions of the head above the temperature at which those regions are subsequently maintained.

Advantageously, the articulating probe head comprises at least one discrete heating element. For example, the probe head may contain one or more resistive heating elements. The heating element(s) may be located in the vicinity of, or may be attached to, the one or more electric motors. One or more of the heating elements may conveniently be attached to or formed integrally with other heat generating components of the device; for example, a circuit board or other electrical component of the apparatus may comprise a heating element. A plurality of such resistive heating elements may advantageously be provided. For example, if the head comprises a plurality of electric motors, a plurality of heating elements may be located in the vicinity of each electric motor (e.g. one or more heating elements may be attached to each motor casing). If a plurality of discrete heating elements are provided, such elements may be connected in electrical series and/or in parallel as required. The heating means may conveniently comprise a heat source that is located externally to the articulating probe head and transfers heat into the head via, for example, a flow of heated fluid such as air.

If one or more discrete heating elements are provided, the control system used to drive the electric motor(s) of the articulating head may be provided separately to the temperature controller. For example, the electronics implementing the temperature controller may be located within the articulating head. Electrical power may then be supplied directly to the temperature controller from a remote power source such as the system controller. This would allow, for example, the motors to be disengaged (e.g. between measurements, in response to an emergency stop, to reduce power consumption during periods of non-use etc) without also having to deactivate the temperature stabilisation system of the apparatus. In such an arrangement, the temperature controller could even be constantly powered, if required, thereby keeping the articulating head at the desired temperature and removing the need to provide any kind of apparatus "warm-up".

Instead of, or in addition to, providing separate heating element(s) the heating means may conveniently comprise the at least one electric motor. For example, the apparatus may advantageously include heating means that are arranged such that the total electrical power supplied to the at least one motor to produce a given torque can be varied. In this manner, the heating means may increase the electrical power supplied to the at least one motor thereby increasing the heat generated by the motor without altering the torque that is produced by that motor. In other words, the efficiency of the motor can be controlled to achieve the required heat input for any given torque.

Advantageously, the at least one electric motor is a brushless electric motor and the heating means is arranged to control the relative phase between the multi-phase electrical power components that are supplied to said motor. The brushless motor may be a multi-phase AC motor; for example, a three, four, five or six phase motor. The heating means may then be arranged to control the relative phase-angle between the magnetic field generated by the electrical supply that is used to power said motor and the constant magnetic field of said motor. In other words, the heating means may be conveniently arranged to control the relative phase angle between the magnetic field generated by said multi-phase electrical power components applied to the motor windings and the magnetic field generated by the component of the brushless electric motor that rotates relative to said motor windings.

The brushless motor may provide the required source of heat because the torque the motor produces for a given total input current is related to the angle between the magnetic field of the rotor and the resultant magnetic field generated by the current flowing through the stator windings (or vice versa where the phase windings rotate and the constant magnetic field is stationary). When the two magnetic fields of a pole pair are at 90° to each other torque is at a maximum (i.e. a tangential torque vector), when they are parallel no torque is produced (i.e. a radial torque vector). In other words, altering the relative phase-angle between the rotor magnetic field and the magnetic field generated by the current components that are supplied to the motor may be used to decrease the overall efficiency (i.e. the amount of torque produced per Watt of electric power) of the electric motor. This allows more power to be supplied to the motor for a given output torque and thus increases the heat generated by the motor without increasing the torque produced thereby.

It should also be noted that such apparatus is preferably arranged so that the brushless electric motor can still produce maximum torque when required. Furthermore, the heating means is advantageously arranged so that when it is controlling the relative phase of the current components supplied to a motor there is a negligible associated effect on the positional control of the apparatus. This can be readily achieved as the thermal time constant of the articulating head is typically long enough for a slow (e.g. seconds) temperature control loop to be established that does not disturb the position control loop. In other words, the temperature control loop may be arranged to have a much lower bandwidth than the position control loop.

Where a multi-pole brushless motor is used the same principle applies, except that the physical angle between winding-field and the rotor-field (i.e. that required to produce a given amount of torque and heat) must be divided by a constant appropriate for the number of poles.

A high frequency AC (i.e. a current having a frequency that is sufficiently high so that no motor torque is induced) or direct current (DC) may also be supplied to an AC motor. Alternatively, an AC current may be supplied to generate heat in a DC motor. In other words, the heating means is conveniently arranged to supply an electrical current to the at least one electric motor that has a frequency component that induces only heating of the coils of the motor.

The articulating probe head conveniently comprises a first electric motor to drive the articulating head about a first rotational axis. In such a case, the temperature sensing means may be arranged to sense temperature in the vicinity of the first electric motor. The temperature sensing means may comprise a temperature sensor located in the vicinity of the electric motor; e.g. a temperature sensor may be attached to the casing of the first electric motor.

The articulating probe head preferably comprises at least a first electric motor and a second electric motor. The inclusion of two motors may be used to drive the articulating head about two rotational axes. The temperature sensing means may then be arranged to sense temperature in the vicinity of both the first and second electric motors. For example, the articulating head may conveniently comprise at least a first temperature sensor and a second temperature sensor. Advantageously, the first temperature sensor is located in the vicinity of the first electric motor and the second temperature sensor is located in the vicinity of the second electric motor. For example, the first temperature sensor may be attached to the casing of the first electric motor and/or the second temperature sensor may be attached to the casing of the second electric motor.

The articulating probe head may advantageously further comprise a third electric motor. Providing three motors allows the articulating head to be driven about three rotational axes. The temperature sensing means may then be arranged to also sense temperature in the vicinity of the third electric motor. For example, the articulating head may conveniently comprise at least first, second and third temperature sensors. The third temperature sensor may be attached to the casing of the third electric motor.

Further motors (e.g. fourth, fifth etc motors) may also be provided if required. Such motors may be used to drive the articulating head about an axis or for any additional purpose.

Apparatus having more than one motor (e.g. having first, second and third motors) may advantageously comprises a temperature controller of the type described above. Such a temperature controller may be arranged to receive a first temperature signal from the first temperature sensor that is located in the vicinity of the first motor and to selectively heat the first motor so as to maintain the temperature sensed by the first temperature sensor within a first predetermined temperature range. Conveniently, the temperature controller is also arranged to receive a second temperature signal from the second temperature sensor that is located in the vicinity of the second motor and to selectively heat the second motor so as to maintain the temperature sensed by the second temperature sensor within a second predetermined temperature range. The temperature controller may also be advantageously arranged to receive a third temperature signal from the third temperature sensor located in the vicinity of the third motor and to selectively heat the third motor so as to maintain the temperature sensed by the third temperature sensor within a third predetermined temperature range.

As described above, the electric motors of the articulating probe head (e.g. the first, second and third motors) may be heated directly by applying appropriate drive signals thereto and/or separate heating elements may be provided (e.g. attached to the motor casing) to permit such heating. The temperature controller can advantageously be configured to establish separate temperature control loops to maintain each electric motor within a selected temperature range. For example, the first, second and third motors may be separately maintained at temperatures within first, second and third predetermined temperature ranges respectively.

The temperature controller may conveniently keep each motor (e.g. the first, second and third motors) at substantially the same temperature. For example, the first, second and third predetermined temperature ranges described above may be substantially the same. However, the temperature controller is advantageously arranged to maintain each motor at a different temperature or within a different temperature range. Keeping the motors at different temperatures is typically preferred because the various motors of an articulating probe head are often located in different thermal environments within the articulating head and may thus dissipate different amounts of heat during use. Furthermore, the probe head may be arranged such that one of the motors is required to perform more work, on average, than the other motor. For example, one motor may need to continually apply a higher torque to maintain the required probe position against the force of gravity. The temperature ranges at which each motor is kept may be pre-set or set by the user in the manner described above.

It should be noted that, if two or more electric motors are provided, each motor may be of the same type. For example, the motors may be three phase AC motors. Alternatively, one motor may differ from another motor. For example, one motor (e.g. the first motor) may be an AC motor and another motor (e.g. the second motor) may be a different type of AC motor or a DC motor. Different motors may also be arranged to impart substantially the same, or different, maximum toques. The skilled person would appreciate the types of motors that would be suitable for different applications and different type of articulating heads.

Advantageously, the articulating probe head is an active or "servoing" head which scans the measurement probe across the part during the measurement process. In such an active head device, the power supplied to the motor(s) varies with time to change the measurement probe position and/or to provide different torque during the scanning process. In other words, the motors are not simply turned on or off in an active head but are powered continuously during use (even when the head is holding the measurement probe in a fixed orientation relative to the co-ordinate positioning machine).

Conveniently, the articulating probe head may be an indexing head or an articulating probe head of any other known type.

Advantageously, a measurement probe is attached to the articulating probe head. The probe may be attached via a kinematic mount and/or may be thermally isolated from the articulating head. Conveniently, the measurement probe can be readily attached to, and detached from, the articulating probe head.

The measurement probe may advantageously comprise a contact probe or a non-contact probe. Preferably, the contact probe comprises an optical sensor. For example, a probe of the type described in EP1086354 may be used. The at least one electric motor is conveniently arranged to control, during use, at least one of the velocity, position and acceleration of the measurement probe.

Advantageously, the temperature sensing means comprises at least one temperature sensor. Each temperature sensor may comprise at least one of a thermal resistor (a thermistor), a digital thermometer chip and a bimetallic strip. However, any temperature sensor of known type may be used. Such a temperature sensor may require physical contact with the articulating head or may be a non-contact thermal sensor such as a thermal (infrared) detector.

A co-ordinate positioning machine may also be provided that comprises the articulating probe head apparatus described above. The articulating probe head may comprise a base portion that is releasably attachable to the quill of the co-ordinate positioning machine. The co-ordinate positioning machine may advantageously comprise a co-ordinate measurement machine (CMM), a machine tool or an inspection robot.

Co-ordinate positioning machines typically comprise a machine controller (such as a personal computer) to control their operation. For example, the machine controller may be arranged to supply electrical power to the linear translation motors that move the quill holding the articulating head along the X, Y and Z axes of the machine. Advantageously, the machine controller of the co-ordinate positioning machine is adapted to also control the at least one motor of the articulating head. In other words, the machine controller is adapted to control operation of the articulating head. This control may be direct or may be via a control interface.

Conveniently, temperature signal(s) from the temperature sensing means is also supplied to the machine controller. The machine controller may thus comprise the temperature controller described above.

The machine controller may also use temperature measured by the temperature sensing means to correct co-ordinate measurements for thermal expansion effects and/or to indicate uncertainties associated with such measurements. For example, the measured temperature of the first, second and third motors may conveniently be used to correct for, or ascertain, thermal expansion effects within the articulating head. One or more additional temperature sensors may also be provided in the probe head (e.g. away from the motors) to provide one or more general temperature readings. Temperature correction may be achieved using calibration data acquired with the articulating head at a number of different temperatures or the machine controller may be programmed with a number of correction factors to account for any variance of the temperature away from a nominal level.

The temperature as measured by the at least one temperature sensor (especially an additional temperature sensor of the type described above) may be used to provide the user with an indication that the apparatus has achieved a nominal thermal level (i.e. that it has "warmed-up").

According to a second aspect of the invention, a method of operating an articulating probe head is provided, the articulating probe head comprising at least one electric motor, wherein the method comprises the steps of (a) measuring the temperature of one or more regions of the probe head and (b) generating heat within the articulating head. Conveniently, step (b) comprises the step of generating heat within the articulating head so as to maintain the temperature measured in step (a) within a temperature range (e.g. at a certain temperature above ambient).

According to a further aspect of the invention, articulating head apparatus for a co-ordinate positioning machine is provided, the apparatus being arranged to retain a measurement probe and comprising at least one motor for controlling, when a measurement probe is attached to said apparatus, at least one of the position, velocity and acceleration of said measurement probe, wherein the at least one motor is additionally arranged to control the temperature of at least part of said articulating head apparatus. Using a motor to generate heat without effecting the amount of torque it imparts is described in more detail above. In this manner, it can be seen that the at least one motor can be used to provide control over both motion of the measurement probe and the temperature of the articulating head.

According to a further aspect of the invention, apparatus for a co-ordinate positioning machine is provided, the apparatus comprising an articulating probe head for supporting a measurement probe, wherein the articulating probe head comprises at least one electric motor, wherein the apparatus comprises a heater for generating heat in the articulating probe head and at least one temperature sensor for measuring temperature at the articulating probe head.

Figure 2:
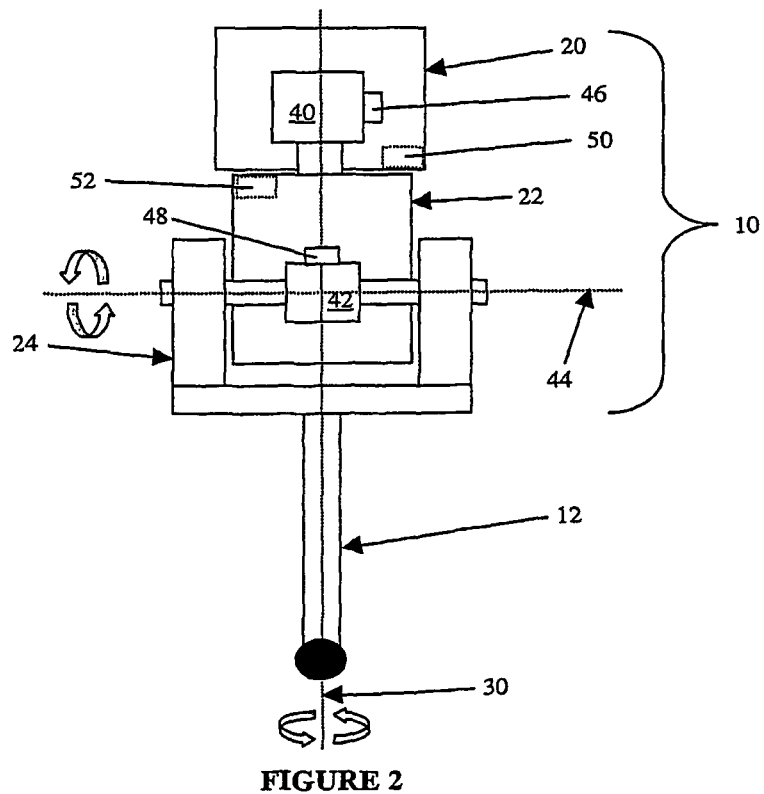
Figure 3:
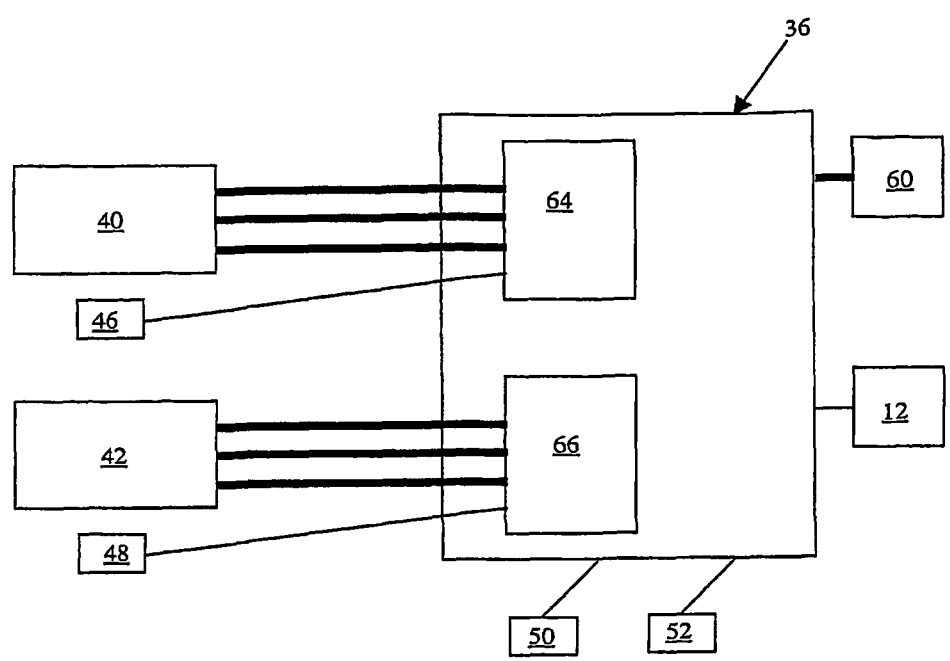

The invention will now be described, by way of example only, with reference to the following drawings in which;

FIG. 1 shows an co-ordinate measurement machine (CMM) comprising an active head, FIG. 2 shows the active, articulating, head of the CMM of FIG. 1 in more detail, and FIG. 3 is a block diagram illustrating the control system of the CMM.

Referring to FIG. 1, a co-ordinate measuring machine (CMM) 2 is shown. The CMM 2 comprises a base 4 supporting a frame 6 which in turn holds a quill 8. Motors (not shown) are provided to move the quill 8 along the three mutually orthogonal axes X, Y and Z.

The quill 8 holds an articulating probe head 10. The probe head 10 has a base portion 20 attached to the quill 8, an intermediate portion 22 and a probe retaining portion 24. The base portion 20 comprises a first motor (not shown) for rotating the intermediate portion 22 about a first rotational axis 30. The intermediate portion 22 comprises a second motor (not shown) for rotating the probe retaining portion 24 about a second rotational axis that is substantially perpendicular to the first rotational axis. Although not shown, bearings may also be provided between the moveable parts of the articulating probe head.

A measurement probe 12 is attached (e.g. using a kinematic mount) to the probe retaining portion 24. The measurement probe 12 may be a touch trigger probe or an analogue probe including a stylus. The probe may comprise an optical sensor. Alternatively, the probe may be a non-contacting probe such as an optical probe.

A machine controller 36 for controlling the operation of the CMM is also provided. The machine controller may be a dedicated electronic control system and/or may comprise a personal computer.

The probe head 10 is a so-called "active head" and, in use, the probe head 10 allows the measurement probe 12 to be moved with two degrees of freedom relative to the quill 8. The combination of the two degree of freedom provided by the probe head 10 and the three linear (X,Y,Z) axes of translation of the CMM allows the measurement probe 12 to be moved about five axes. This permits so-called "five-axis" measurements of an associated part 34 mounted to the base portion 20 of the machine.

The machine controller 36 is arranged to provide appropriate drive currents to the first and second motors so that, during use, each motor imparts the required torque. The torque imparted by each motor may be used to cause movement about the associated rotational axis or to maintain a certain rotational position. It can thus be seen that, for an active head, a drive current needs to be applied continuously to each motor of the active probe head 10 during use; i.e. each motor needs to be powered even if there is no movement required about the associated rotational axis.

It should be noted that FIG. 1 provides only a top level description of a CMM comprising an active head. A more complete description of such apparatus can be found elsewhere; for example, see EP402440 (especially columns 6-20) the contents of which are incorporated herein by reference.

The inventors have found that thermal expansion effects within an active articulating probe head of the type described with reference to FIG. 1 can significantly degrade co-ordinate measurement accuracy. In particular, it has been found that the heat necessarily generated by the motors of the active head will heat parts of the probe head. Furthermore, the amount of such heating depends on the torque applied by the motors and will thus vary with scanning speed and the force that is applied when the probe scanned across the surface of a part.

In addition to variations in the power supplied to the motors of the active head, it has also been found that the total amount and/or the profile of heat dissipation from the probe head can vary with probe head orientation. In other words, thermal losses can differ when the active probe head is rotated about its two axes into different positions.

Variations in both the rate of heat generation and the amount of heat dissipation has been found to cause unpredictable variations in the thermal profile of the active head during use. Furthermore, the ambient thermal environment affects the overall thermal profile of the probe head. Following the above, it can be seen that significant variations in the thermal profile of an articulating probe head can occur during use. Such temperature variations lead, in turn, to thermal expansion within the active head that can seriously degrade measurement accuracy.

A number of techniques for overcoming errors produced by thermal expansion in indexing articulating heads have been described previously in EP690286. The prior methods include providing a heat source, such as a resistive heater, that has a constant heat output which is significantly greater than the heat generated by the electric motors of the head. In such an arrangement, the additional heat generated by the motors produces an proportionally reduced amount of thermal expansion.

EP690286 also describes having a heat source that is only activated when the electric motors of the indexing head are inactive (i.e. when the articulating head is locked in a certain measurement position) so that a constant current is supplied to the probe head during operation. It can, however, be seen that the techniques of EP690286 are typically only applicable to indexing heads where the motor is either on or off (i.e. not active heads where the power supplied to the motors varies during use). Furthermore, the technique relies on there being a substantially constant rate of heat dissipation from the head and an invariant ambient thermal environment. Neither of these assumptions have been found to be acceptable when high accuracy measurements are required. An improved technique of mitigating the effects of thermal expansion in an articulating probe head in accordance with the present invention is thus described below.

Referring to FIG. 2, an active head of the present invention is shown in more detail. The features illustrated in FIG. 2 that are common to those described with reference to FIG. 1 have been assigned like reference numerals. FIG. 2 thus shows an active head 10 having a base portion 20, an intermediate portion 22 and a probe retaining portion 24.

A first motor 40 mounted in the base portion 20 is provided to rotate the intermediate portion 22 relative to the base portion 20 about the first rotational axis 30. A second motor 42 mounted in the intermediate portion 22 is provided to rotate the probe retaining portion 24 relative to the intermediate portion 22 about the second rotational axis 44. The first rotational axis 30 is often termed the "D-axis" whilst the second rotational axis 44 is often called the "E-axis". In this example, the first and second motors are both three-phase alternating current (AC) motors. However, other types of AC motor or direct current (DC) motors may alternatively be used.

The probe head 10 also comprises a first thermistor 46 attached to the casing of the first motor 40 and a second thermistor 48 attached to the casing of the second motor 42. Additional thermistors 50 and 52 are also provided at different locations within the probe head casing. Although thermistors provide a simple, and cheap, way of measuring temperature the skilled person would appreciate the numerous temperature sensors that could alternatively be used.

Referring now to FIG. 3, a schematic illustration of the electronic layout of the control system of the CMM described with reference to FIGS. 1 and 2 is provided. The control system comprises a machine controller 36 which may comprise, for example, a personal computer (PC).

The machine controller 36 provides a three phase power supply to each of the first motor 40 and the second motor 42 of the active head. Appropriate control signals are also provided to the motors 60 that control movement of the quill along the X, Y and Z axes. The machine controller 36 also receives a data signal from the measurement probe 12 and each of the first, second and additional thermistors 46, 48, 50 and 52.

The machine controller 36 includes a first control portion 64 that is arranged to supply a three phase drive signal to the first motor 40. The first control portion 64 also receives a signal from the first thermistor 46 that is indicative of the temperature of the casing of the first motor 40. In response to this temperature signal, the first control portion 64 is arranged to vary the total electrical power that is supplied to the first motor 40 and hence the heat that is generated thereby. It is however important to note that the three phase drive signal is selected so that, during use, the motor 40 produces the required amount of torque.

As would be appreciated by a skilled person, three phase AC motors are arranged to receive three alternating current signals. The phase difference between the different components of the power supply creates a rotating electromagnetic field within the motor. If the current components are displaced in phase from each other by 120°, the motor operates at optimum efficiency. However, altering the phase between the three AC components away from the optimum level will decrease the efficiency of the motor. In other words, more electrical power (i.e. an increased current) is required for the motor to produce the same amount of torque. It can therefore be seen that the heat generated by a three phase motor can be increased without any corresponding increase in the torque that is imparted by the motor. To keep the centre of the magnetic field generated by the currents near the axis of motor rotation, it is preferred that the phase of the current components are altered so as to control the relative phase-angle between the magnetic field generated by the electric current and the constant magnetic field of said motor. Although by no means essential, this reduces the out of centre forces that may otherwise be present.

The first control portion 64 is thus arranged to control the relative phase and amplitude of the three phase power supply provided to the first motor 40 to (a) cause the required torque to be imparted by the motor and (b) generate the required amount of heat within the motor. Control over the heat generated by the first motor allows a closed feedback control loop to be established to maintain the temperature of the first motor within a first predetermined temperature range.

The second control portion 66 allows a separate feedback loop to be established to maintain the temperature of the second motor 42 within a second predetermined temperature range. The first and second predetermined temperature ranges may be the same or different. The temperature range(s) may be factory set, or a number of such ranges may be provided for operation in different ambient environments. Alternatively, the temperature range(s) may be defined relative to an ambient or other temperature reading.

Although separate control loops are described, it would be possible to implement a single temperature control system for both motors using one or more of the thermistors. Similarly, the temperature measurements from any one or more of the additional thermistors 50 and 52 may be used in the feedback loop of the first and/or second control portions. It is, however, preferable for the temperature sensor used in the feedback loop to be located near the heat source so as to minimise any control loop instabilities or oscillations that may arise from thermal lag effects.

It should be noted that although altering the relative phase of the three phase power supply can cause the required heating effect, other ways of generating heat within the probe head are possible. For example, an AC component could be supplied to the motors that has a sufficiently high frequency to heat the motor coils without imparting any torque. High frequency AC heating of this type could also be used with different types of motor, e.g. DC or single phase AC motors. Instead of using the motor as the heat source, it would also be possible to provide separate heat sources. For example, one or more resistive heating elements could be provided. Such heating elements could be located inside the housing of the probe head or attached to the external surface of the head.

In addition to, or instead of, providing closed loop temperature control the machine controller may use the temperature measured by one or more of the thermistors to compensate for thermal errors in the co-ordinate measurements. For example, the additional thermistors 50 and/or 52 may be used to provide a general measure of the temperature of the active head. This measured temperature could then be used, in conjunction with previously acquired calibration data, to correct the co-ordinate measurements acquired by the machine. In other words, a compensation factor could be used to correct the measured co-ordinates for changes in the temperature of the active head.

It should also be remembered that FIG. 3 simply illustrates the functionality of a CNN control system. In particular, the various components of the machine controller 36 may not be physically located in the same box, but may be placed at different locations on the machine. For example, the probe head itself may contain some or all of the electronics of the first and second control portions 64 and 66.

Although an "active" articulating head is described above, the invention is also applicable to other types of articulating head. For example, an indexing head would also experience different amounts of heat dissipation with head orientation and would also have a temperature profile that depends on the ambient temperature. The present invention can thus be seen to have advantages over the techniques of EP690286 when applied to an indexing articulating head.

It should be noted that although the examples described with reference to FIGS. 1-3 relate to a CMM, the articulating probe head could be mounted to any type of co-ordinate positioning machine. The articulating probe head could, for example, be mounted to a machine tool.

The invention claimed is:

1. An apparatus for a co-ordinate positioning machine, the apparatus comprising:
   an articulating probe head that supports a measurement probe, the articulating probe head including at least one electric motor;
   a heater that generates heat in the articulating probe head; and
   a temperature sensor that determines a temperature at the articulating probe head.

2. The apparatus according to claim 1, wherein the articulating head includes at least one temperature sensor.

3. The apparatus according to claim 2, wherein the at least one temperature sensor is a thermal resistor.

4. The apparatus according to claim 1, wherein the temperature sensor is arranged to sense the temperature at one or more points of the articulating head at a position spaced from the at least one electric motor.

5. The apparatus according to claim 1, further comprising a temperature controller, the temperature controller receiving a temperature signal from the temperature sensor and selectively activating the heater so as to maintain the temperature sensed by the temperature sensor within a first temperature range.

6. The apparatus according to claim 5, wherein the temperature controller is arranged so that the heater generates heat at an increased rate during apparatus start-up compared with the rate of heat generation that is subsequently used to maintain the temperature within the first temperature range.

7. The apparatus according to claim 1, wherein the heater includes at least one discrete heating element.

8. The apparatus according to claim 1, wherein the heater is arranged such that the total electric power supplied to the at least one motor to produce a given torque can be varied.

9. The apparatus according to claim 8, wherein the at least one electric motor is a brushless electric motor and the heater is arranged to control the relative phase between the multi-phase electrical power components that are supplied to the motor.

10. The apparatus according to claim 9, wherein the heater controls the relative phase angle between the magnetic field generated by the multi-phase electrical power components applied to the motor windings and the magnetic field generated by the component of the brushless electric motor that rotates relative to said motor windings.

11. The apparatus according to claim 1, wherein the heater supplies an electrical current to the at least one motor having a frequency component that induces only heating of the coils of the motor.

12. The apparatus according to claim 1, wherein the at least one electric motor of the articulating probe head comprises at least a first electric motor and a second electric motor.

13. The apparatus according to claim 12, wherein the articulating head further includes at least a third electric motor.

14. The apparatus according to claim 12, wherein the articulating head includes the temperature sensor, the temperature sensor including at least a first temperature sensor and a second temperature sensor, and the first temperature sensor is located in the vicinity of the first electric motor and the second temperature sensor is located in the vicinity of the second electric motor.

15. The apparatus according to claim 14, wherein the first temperature sensor is attached to the casing of the first electric motor and the second temperature sensor is attached to the casing of the second electric motor.

16. The apparatus according to claim 14, further comprising a temperature controller, the temperature controller receiving a first temperature signal from the first temperature sensor and selectively heating the first motor so as to maintain the temperature sensed by the first temperature sensor within a first predetermined temperature range.

17. The apparatus according to claim 16, wherein the temperature controller receives a second temperature signal from the second temperature sensor and selectively heats the second motor so as to maintain the temperature sensed by the second temperature sensor within a second predetermined temperature range.

18. The apparatus according to claim 1, wherein the articulating head includes the temperature sensor, the temperature sensor including at least a first temperature sensor and a second temperature sensor.

19. The apparatus according to claim 1, wherein the articulating probe head is an active probe head.

20. The apparatus according to claim 1, wherein a measurement probe is attached to the articulating probe head.

21. The apparatus according to claim 20, wherein the measurement probe includes a non-contact probe.

22. The apparatus according to claim 20, wherein the measurement probe includes a contact probe.

23. The apparatus according to claim 22, wherein the contact probe includes an optical sensor.

24. The apparatus according to claim 20, wherein the at least one electric motor controls at least one of a velocity, position and acceleration of the measurement probe.

25. The apparatus
according to claim 1 in combination with the co-ordinate positioning machine.

26. The apparatus according to claim 25 further comprising:
a machine controller wherein the machine controller is adapted to control the at least one motor of the articulating head.

27. The apparatus according to claim 26, wherein a signal from the temperature sensor is supplied to the machine controller.

28. The apparatus according to claim 27, wherein the temperature as measured by the temperature sensor is used by the machine controller to correct co-ordinate measurements for thermal expansion effects.

29. A method of operating an articulating probe head, the articulating probe head including at least one electric motor, the steps of the method comprising:
measuring the temperature of one or more regions of the probe head, and
generating heat within the articulating head.

30. The method according to claim 29, wherein the step of generating heat within the articulating head maintains the temperature measured in one or more regions of the probe head within a temperature range.

* * * * *